United States Patent [19]

Hanushevsky et al.

[11] Patent Number: 5,530,849

[45] Date of Patent: Jun. 25, 1996

[54] METHOD OF READING DYNAMIC, HIERARCHICAL FILE SYSTEM DIRECTORIES

[75] Inventors: Andrew Hanushevsky; Lenny Silver, both of Ithaca, N.Y.

[73] Assignee: Cornell Research Foundation, Inc., Ithaca, N.Y.

[21] Appl. No.: 106,732

[22] Filed: Aug. 16, 1993

[51] Int. Cl.⁶ .................................................. G06F 17/30
[52] U.S. Cl. ................ 395/600; 364/222.81; 364/282.3; 364/DIG. 1
[58] Field of Search ...................... 395/600, 425, 395/156–161, 400; 364/DIG. 1, 419.13, 419.19, 282.3

[56] References Cited

U.S. PATENT DOCUMENTS

| | | | |
|---|---|---|---|
| 5,185,860 | 2/1993 | Wu | 364/DIG. 1 |
| 5,202,982 | 4/2993 | Gramlich et al. | 395/600 |
| 5,218,696 | 6/1993 | Baird et al. | 395/600 |
| 5,276,867 | 1/1994 | Kenley et al. | 395/600 |
| 5,313,646 | 5/1994 | Hendricks et al. | 395/600 |
| 5,412,808 | 7/1991 | Bauer | 395/600 |

OTHER PUBLICATIONS

Crossing The Internet Threshold, An Instructional Handbook by Tennant, Ober & Lipow.
Pocket Guides to the Internet, Veljkov et al., 1994.

*Primary Examiner*—Thomas G. Black
*Assistant Examiner*—Hosain T. Alam
*Attorney, Agent, or Firm*—Salzman & Levy

[57] ABSTRACT

The present invention features a deterministic method of reading dynamic, hierarchical file systems. The method assigns alternate internal names (AINs) to names in a file system name space or file system directory. The names have unique values, typically not exceeding 32 bits, without obvious changes to the RFD protocol being used. The values can be reused or immediately reassigned to a different name in the same directory or the same name in a different directory. Name values forming a member list can be sorted. When a directory read command is initiated with a zero value, directories are read in the order of values in the member list. In each directory entry structure returned to a caller, a "continuation marker" or cookie value is set to the AIN value associated with the name that is returned in the structure. When a directory read command is initiated with a non-zero continuation marker value, an AIN value greater than or equal to the continuation marker value is found in the attached member list. The directory entries are returned, if the AIN value matches the continuation marker value. This method ensures that only directory entries having associated AIN values higher than the continuation marker values are returned. No duplicate or incorrect information is returned.

7 Claims, 2 Drawing Sheets

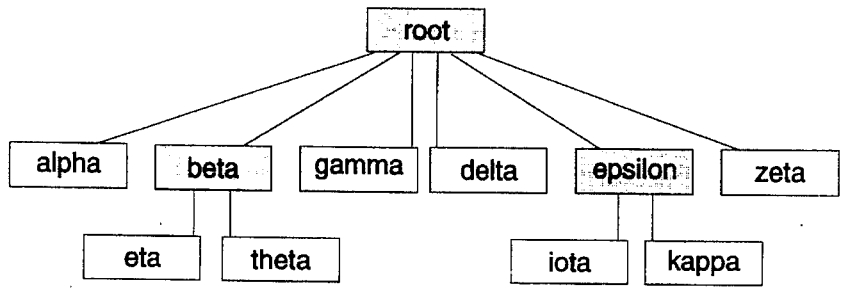
Figure 1
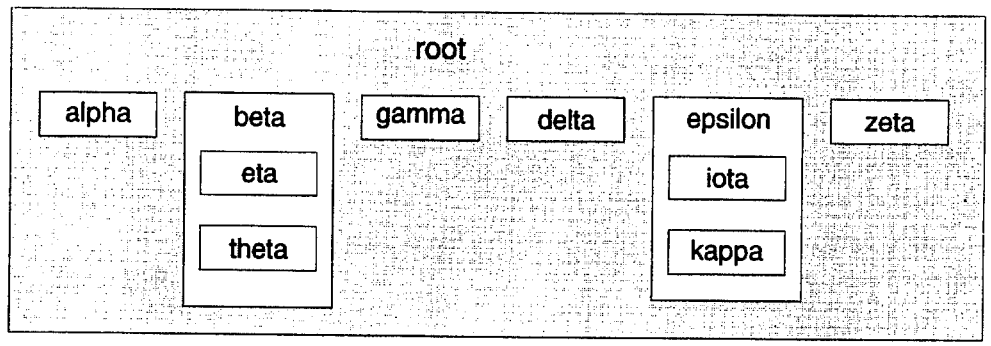
Figure 2
```
struct  readdirargs {
        char            dir_handle[32];
        unsigned long   cookie;
        unsigned long   count;
        };
struct entry {
        unsigned        fileid;
        string          file_name[255];
        nfscookie       cookie;
        entry           *nextentry;
        };
union readdirres switch stat status) {
        case NFS_OK:
                struct {
                        entry   *entries;
                        bool    eof;
                        } readdirok;
        default:  void;
        };
readdirres NFSPROC_READDIR( readdirargs ) = 16;
```
Figure 3

METHOD OF READING DYNAMIC, HIERARCHICAL FILE SYSTEM DIRECTORIES

This invention was made with Government support under Grant NAG-1358 awarded by The National Aeronautics and Space Administration. The Government has certain rights in the invention.

FIELD OF THE INVENTION

The present invention pertains to dynamic, hierarchical file systems used with computers, and, more particularly, to a method of accessing the contents of a directory of such hierarchical file systems without return of duplicate or erroneous directory entries.

BACKGROUND OF THE INVENTION

In accessing directories in a hierarchical file system, it is necessary to specify a complete path. Certain protocols return to the file system or other program a variable number of directory entries as defined by the entry structure. When these protocols are accessed via a subroutine, the number of bytes returned by the subroutine may exceed the size of the input argument to the subroutine, requiring multiple subroutine calls to obtain all of the entries. The problem with schemes such as this is that the directory may change between "Read From Directory" (RFD) operations, logically or physically invalidating the value assigned thereto. There being no known simple mechanism to correct this situation (other than prohibiting directory modifications, until the complete directory has been read), spurious or duplicate directory entries are often returned to the caller. Thus, the RFD operation becomes nondeterministic, with misleading directory listings and errors, resulting sometimes, even, in a failed program.

The present invention is a system that allows a computer program to read a directory using a deterministic method. The invention uses a unique, alternate internal naming (AIN) method to identify directory entries. This method is compatible with most file systems, such as the Unix® file system employing the inode mechanism. The inventive method uniquely allows AIN values to be reused. The method is not compromised, even when the AIN value is immediately reassigned to a different name in the same directory or the same name in a different directory.

DISCUSSION OF RELATED ART

In U.S. Pat. No. 5,187,786 (issued to Densmore et al on Feb. 16, 1993), illustrated is a METHOD FOR APPARATUS FOR IMPLEMENTING A CLASS HIERARCHY OF OBJECTS IN A HIERARCHICAL FILE SYSTEM. The method is designed to be used with a "windows"-based computer system. Each hierarchy of directories and files comprises a path file. The contents of these path files are logically related to each other, based on their class relationships. Using these path files, inheritance is achieved by controlling the invocation of class methods. Accessing via class instance variables allows for data abstraction.

In U.S. Pat. No. 4,945,475 (issued to Bruffey et al on Jul. 31, 1990), a HIERARCHICAL FILE SYSTEM TO PROVIDE CATALOGING AND RETRIEVAL OF DATA is shown. An upside-down tree is utilized to provide a downwardly expanding cataloging structure wherein directories provide for further branching. Branching is terminated when a file is reached. Each directory is assigned a unique directory identifier value. Each file or directory is coupled with the directory identifier value of its parent, in order to provide the interconnection necessary to form the cataloging structure. The cataloging structure is organized in the leaf nodes of a B-Tree structure and distributed in an ascending order of the key values to provide a systematic search for a given key. Unlike the present invention, Bruffey et al provide descriptors that cannot be reused. Furthermore, the patented invention has a sorting scheme that is limited to only an ascending order.

SUMMARY OF THE INVENTION

In accordance with the present invention, there is provided a deterministic method of reading dynamic, hierarchical file systems. The method assigns alternate internal names (AINs) to names in a file system name space or file system directory. The names have AIN values, typically not exceeding 32 bits, without obvious changes to the RFD protocol being used. The values can be reused or immediately reassigned to a different name in the same directory or the same name in a different directory. AIN values forming a member list can be sorted in either ascending or descending order. Any method can be used to generate AIN values, as long as no two names in the same directory are assigned the same AIN value. The algorithm used to read a directory can be used with any protocol allowing AIN values to be passed between directory management routines and the program reading the directory (such as the Network File System® [NFS®] read directory protocol defined by Sun Microsystems, Inc., described later herein).

When a directory read command is initiated with a zero value, directories are read in the order of values in the member list. In each directory entry structure returned to a caller, a "continuation marker" or cookie value is set to the AIN value associated with the name that is returned in the structure. To continue reading the directory, the caller sets the continuation marker to be the value in the last entry of the data structures returned. When a directory read command is initiated with a non-zero continuation marker value, and AIN values are sorted in ascending order, an AIN value that is greater than or equal to the "continuation marker" value is found in the attached member list. The directory entries (beginning with the directory entry having the next or subsequent AIN value in the attached member list) are returned, if the AIN value matches the continuation marker value. When the continuation marker value is not present on the list (i.e., it is not found), then the directory entries (starting with the directory entry assigned to the AIN value that is immediately greater than the continuation marker value in the attached member list) are returned.

The above method ensures that only directory entries having associated AIN values higher than the continuation marker values are returned. No duplicate or incorrect information is returned.

In an alternate embodiment (DDAMx), the inventive method adds a directory file handle encoded with information that will avoid possible double-jeopardy situations. A double-jeopardy situation is one in which a directory is added having an AIN value higher than a subsequent AIN value having a name the same as a recently deleted directory with an AIN value lower than the subsequent name value. The file handle contains logical time information, which differentiates directories by entry time alone.

It is an object of the present invention to provide an improved method of reading dynamic, hierarchical file systems.

It is another object of this invention to provide a deterministic access method for a directory that will eliminate the return of misleading directory information, as well as errors.

It is a further object of the current invention to provide a directory access method that will avoid double-jeopardy situations.

It is yet another object of the present invention to provide an access method for hierarchical file systems whereby AIN sorting can be accomplished in either ascending or descending order.

BRIEF DESCRIPTION OF THE DRAWINGS

A complete understanding of the present invention may be obtained by reference to the accompanying drawings, when considered in conjunction with the subsequent detailed description, in which:

FIG. 1 illustrates a schematic diagram of a hierarchical file system name space, using trees;

FIG. 2 depicts a schematic diagram of a hierarchical file system name space, using containment;

FIG. 3 shows a schematic diagram of a Network File System® data structure for a "Read From Directory" operation;

DESCRIPTION OF THE PREFERRED EMBODIMENT

Figure 4:
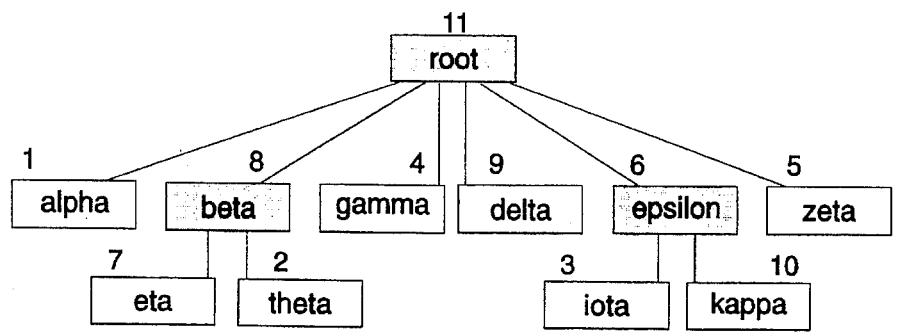
FIG. 4 illustrates a schematic diagram of a hierarchical file system name space, with the unique AIN values utilized in the method of this invention.

Generally speaking, certain protocols return to the file system or other program a variable number of directory entries as defined by the entry structure. When these protocols are accessed via a subroutine, the number of bytes returned by the subroutine may exceed the size of the input argument to the subroutine, requiring multiple subroutine calls to obtain all of the entries. The problem with schemes such as this is that the directory may change between "Read From Directory" (RFD) operations, logically or physically invalidating the value assigned thereto. There being no known mechanism to correct this situation (other than prohibiting directory modifications, until the complete directory has been read), spurious or duplicate directory entries are often returned to the caller. Thus, the RFD operation becomes non-deterministic, with misleading directory listings and errors, resulting sometimes in a failed program. The invention incorporates a system by which a computer program can read a directory, using a deterministic method. It uses a unique, alternate internal naming (AIN) method to identify directory entries. This method is compatible with most file systems, such as the Unix® file system, employing the inode mechanism. The inventive method uniquely allows values to be reused. The method is not compromised, even when the AIN value is immediately reassigned to a different name in the same directory or the same name in a different directory.

Assume the existence of a computer file system containing files that are identified by arbitrary names. Furthermore, assume that these names can be arranged in a hierarchical order using arbitrary rules. Such a mechanism implements a hierarchical name space for a file system. An example of such a scheme is shown in FIG. 1.

Referring to FIG. 1, a tree of names is shown, with the topmost level named root. Typically, each node of the tree which points, or may point, to a sub-tree of names is called a directory (shown by shaded boxes in FIG. 1). Here, directories have the names of root, beta and epsilon. End nodes (i.e., those tree entries which do not point to sub-trees) represent files. Thus, a directory contains names of file system objects, some of which may be directories and others not (e.g., files).

To reference any tree node (i.e., directory or file), one must specify the complete path (i.e., the name of each node in proper order) to the component, usually using some special separating character. For example, to reference "kappa", where the special separating character is slash (/), "/root/epsilon/kappa" can be specified. This mechanism is used by Unix®-style file system name spaces.

A containment mechanism can be used to implement an equivalent hierarchical naming scheme, as shown in FIG. 2.

Referring to FIG. 2, a collection of names is shown with the outermost box named root. Typically, each box that contains, or may contain, other boxes is called a folder (shown by unshaded boxes in FIG. 2). Here, folders have the names of root, beta and epsilon. Those boxes which do not, or cannot, contain boxes represent files. Thus, a folder contains names of file system objects, some of which may be folders and others not (e.g., files).

To reference any name (i.e., folder or file), one must specify the complete path (i.e., the name of each folder in proper order) to the component, usually using some special separating character. For example, to reference "kappa", where the special separating character is colon (:), "root:epsilon:kappa" can be specified. This mechanism is used by systems similar to the Macintosh$^{SM}$ operating system.

It is common in hierarchical name spaces to list the contents of a directory or folder. Most operating systems have a defined interface that a computer program can use to obtain the names contained in a directory or folder.

Referring to FIG. 3, data structures are shown that are used by the interface defined by Sun Microsystems, Inc., for the Network File System® (NFS®) protocol.

According to that protocol, the NFSPROC—READDIR function returns a variable number of directory entries, as defined by the entry structure. The total number of bytes that are returned cannot exceed the value in the input argument count in structure readdirargs. Therefore, multiple calls to the NFSPROC_READDIR function may be required to read all of the directory entries. The value in variable cookie allows for the sequential reading of the directory. Each cookie value in structure entry is an opaque pointer to the next directory entry. As an input argument, the value specifies where the reading of the directory should be resumed. A value of zero indicates the first entry. Thus, setting cookie in the readdirargs structure to be the cookie value in the last returned occurrence of the entry structure allows for the directory to be read sequentially from start to finish.

While the example given herein is for the NFS® protocol, the mechanism to deterministically read a described directory is applicable to any other protocol or interface using a similar scheme.

One specific problem with schemes such as this is that the directory may change between "Read From Directory" (RFD) operations, logically or physically invalidating the cookie value. There is no known mechanism that easily or reliably detects and corrects an invalid cookie. This is especially true for stateless file servers. The result is that duplicate or spurious directory entries may be returned to the caller, making the RFD operation non-deterministic. When this does occur, the usual outcome is misleading directory listings, errors and/or failing programs.

The Deterministic Directory Access Mechanism (DDAM) of this invention allows a computer program to read a directory using a deterministic method with extremely high probability. (DDAMx, a related method, is a completely deterministic mechanism which will be described hereinafter.) DDAM is compatible with NFS® and other similar protocol or program interfaces. Furthermore, DDAM remains deterministic, even when the target directory is changing between program calls to the interface reading the contents of a directory.

In order for DDAM to function, one of the following alternate internal naming (AIN) methods must be employed.

a) Each name in a file system name space must be assigned an arbitrary but unique value, typically not exceeding 32 bits, without obvious changes to the RFD protocol being used; or b) each name in a file system directory must be assigned an arbitrary but unique value, typically not exceeding 32 bits, without obvious changes to the RFD protocol being used (i.e., values may be duplicated across directories).

Method "a" is illustrated in FIG. 4, where each name is assigned an arbitrary but unique value. The DDAM alternate internal naming requirement is easily met by most file systems. For example, in Unix® file systems, each name is associated with a unique 32-bit number, called an inode. For file or name space systems that do not employ the inode mechanism, any other AIN value generating mechanism may be substituted.

DDAM allows the AIN values to be reused. DDAM functionality is not compromised, even when the AIN value is immediately reassigned to a different name in the same directory or the same name in a different directory.

Referring again to FIG. 4, root is assigned the value 11. It contains names having values of (reading left to right) 1, 8, 4, 9, 6 and 5. The directory named beta (number 8) contains names having values of 2 and 7, respectively. The directory named epsilon (number 6) contains names having respective values of 3 and 10.

In DDAM, a list of AIN values (which is referred to herein as a member list) can be sorted in ascending or descending collated order.

Figure 5:
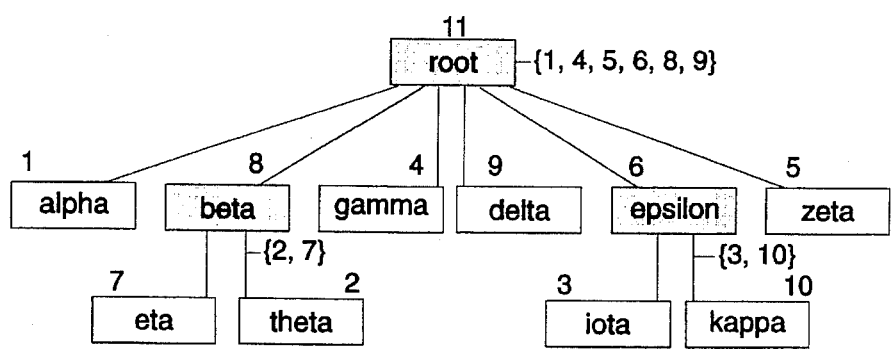
FIG. 5 depicts a schematic diagram of a hierarchical file system name space, with member lists.

Referring to FIG. 5, a list of AIN values is shown in ascending order. It should be understood, however, that DDAM will work equally well with minor, obvious changes, when the list is sorted in descending order. The list of AIN values is constructed and the list logically attached to the name of the directory. The list always represents the current contents of the directory.

The algorithm, based on NFS®-type protocols, that must be employed with the unique alternate internal naming mechanism is characterized by the following conditions:

When NFSPROC_READDIR is called with a value of zero, directory entries (beginning with the directory entry assigned the first value in the attached member list) are returned to the caller. The reading of the directory must be done in the order of the values in the attached member list, starting with the first entry in the list.

In each directory entry structure returned to the caller, the cookie value is set to the AIN value associated with the name returned in the structure. (In fact, the value that appears next in the list may be returned with minor, but obvious, changes to the algorithm. This alternative is not discussed herein.)

To continue reading the directory, the caller sets the cookie value in the readdirargs structure to be the value in the last entry structure returned.

Upon a call to NFSPROC—READDIR with a non-zero cookie value, an AIN value that is greater than or equal to the cookie value is found in the attached member list. Any suitable search algorithm (e.g., a binary search) may be employed.

Directory entries, beginning with the directory entry assigned to the next AIN value (i.e., sequentially adjacent) in the attached member list, are returned to the caller if the AIN value matches the cookie value. That is, the reading of the directory must be performed in the order of the values in the attached member list starting with the next AIN value.

Directory entries, beginning with the directory entry assigned the AIN value in the attached member list that is immediately greater than the cookie value, are returned to the caller if the cookie value is not present in the list (i.e., it was not found). That is, the reading of the directory must be performed in the order of the values in the attached member list starting with the AIN value that would have been chosen, if the cookie had been present therein.

The following DDAM-specific side-effects occur:

Removal of entries from the directory cannot cause incorrect or duplicate information to be returned. In fact, only directory entries that actually exist in the list at the time that they are requested are returned.

When a directory entry is added having an associated AIN value lower than a subsequent cookie value, that directory entry is not returned.

When a directory entry is added having an associated AIN value higher than a subsequent cookie value, that directory entry is returned.

The DDAM mechanism, described herein, is sensitive to a double-jeopardy phenomenon. When a directory entry is added having an AIN value higher than a subsequent cookie value, but having a name the same as a recently deleted directory entry with an AIN value lower than a subsequent cookie value, that name is still returned. This makes it appear that a duplicate directory entry is being returned. This may be sufficiently problematic to be of concern, although it should be noted that this phenomenon is rare.

An extended DDAM mechanism (DDAMx) may be used to solve this problem.

In DDAMx, the directory file handle (e.g., dir_handle in the readdirargs structure) passed by the caller to the RFD operation is used to hold encoded information that completely avoids the double-jeopardy phenomenon.

The DDAMx method defines a time-of-entry value or logical time. Logical time may be the actual time, or it may be based on an event-counter (e.g., inode generation number). The value must, however, be monotonically increasing, relative to actual time. Logical time must be to the precision necessary in order to differentiate by logical time alone two name additions to a directory. Specifically, the directory file handle must contain the logical time that the handle was generated. Additionally, each directory entry must be stamped with the logical time that the name was inserted in the directory. This can easily be accomplished, since most file systems record the time that a directory entry was created.

The algorithm to return directory entries used with DDAMx is similar to the DDAM algorithm, with the following exception:

Before a directory entry is returned to the caller, the creation time of the entry is compared with the time encoded in the directory file handle. The entry is skipped, and the next entry with an appearing AIN value in the attached member list is considered, if the creation time is greater than the time encoded in the directory file handle.

In DDAMx, a directory file handle must be treated as a time-oriented snapshot of the contents of a directory. This is imperative; should the directory file handle be used to reread the contents of a changing directory for a very long period of time, fewer and fewer directory entries will be returned. Only those directory entries that existed at the time that the directory file handle was created (and still exist when the directory is read) are returned. In practice, this is not problematic; a new directory file handle is usually obtained to completely read the contents of a directory, after the previous file handle has been used.

Figure 6:
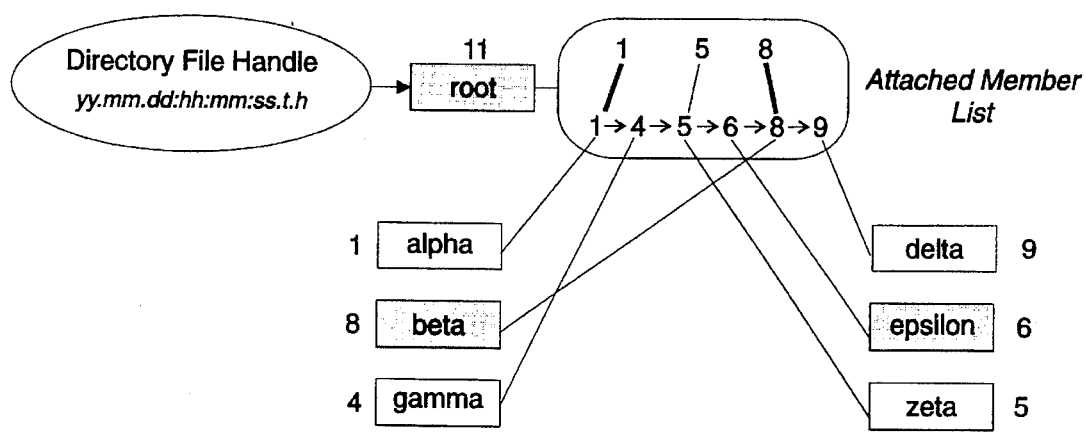
FIG. 6 shows a schematic diagram of the inventive method as used in the "Cornell Name Server".

Referring to FIG. 6, a practical implementation of DDAM (as well as DDAMx) is demonstrated by the "Cornell Name Server" (CNS) design. The CNS maintains a hierarchical Unix®-like name space for an arbitrary file system. Each name in the name space is assigned an AIN value. The member list values are arranged in a B-Tree that is anchored from the directory to which the list is attached.

When an RFD operation is requested, the CNS searches the attached member list for a value greater than or equal to the supplied cookie value. Once the appropriate member list value is found, as described in the DDAM algorithm, directory entries are returned in attached member-list order. This is optionally subject to the time stamp in the directory file handle (i.e., DDAMx). The added time/space overhead is O(log n), where "n" is the number of entries in the attached member list.

In existing systems where the member list cannot be practically attached to the directory due to design constraints, DDAM and DDAMx can still be employed. In such cases, a separate index (e.g., B-Tree) of AIN values can be maintained for the complete file system with the index keys being tuples. The first entry in the tuple is the AIN value assigned to the directory; the second entry is the AIN value assigned to the member of that directory. The AIN value assigned to the directory must be encoded in the directory file handle. The search for the next directory entry employs the same algorithm as described for DDAM and DDAMx. A new cookie value is constructed, however, from the supplied cookie value by prefixing the directory AIN value from the directory file handle to the supplied cookie value in the readdirargs structure. This is accomplished before conducting a search of the file system member index. When this mechanism is employed, index schemes that use front key compression perform best.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A method of reading a dynamic, hierarchical file system having a directory entry structure, comprising the steps of:

a) assigning alternate internal names (AINs) to names in a file system name space or file system directory of a dynamic, hierarchical file system;

b) providing the AIN names with values typically not exceeding 32 bits of information, without obvious changes to the RFD protocol being used;

c) forming a member list with said name values;

d) sorting said member list in either ascending or descending order;

e) initiating a directory read command;

f) accessing directory information according to a given algorithmic protocol defining said hierarchical file system; and g) in each directory entry structure accessed, setting a "continuation marker" value to the AIN value associated with a name that is accessed in said directory entry structure.

2. The method of reading a dynamic, hierarchical file system in accordance with the method of claim 1, wherein directories are read in the order of values in the member list.

3. The method of reading a dynamic, hierarchical file system in accordance with the method of claim 1, wherein said method further includes the steps of:

h) continuing reading the directory; and i) setting a "continuation marker" value in one of the directory entry structures to be the value in the last directory entry structure that is accessed.

4. The method of reading a dynamic, hierarchical file system in accordance with the method of claim 3, wherein said method further includes the steps of:

j) initiating a directory read command with a non-zero "continuation marker" value;

k) finding an AIN value that is greater than or equal to the "continuation marker" value in the member list; and l) accessing directory entries, starting with a directory entry having the next or subsequent AIN value in the member list, if the AIN value matches the "continuation marker" value.

5. The method of reading a dynamic, hierarchical file system in accordance with the method of claim 1, wherein said method further includes the step of:

h) accessing directory entries, starting with the directory entry assigned to an AIN value in the member list that is immediately greater than the "continuation marker" value, when the "continuation marker" value is not present on the member list.

6. The method of reading a dynamic, hierarchical file system in accordance with the method of claim 1, wherein said method further includes the step of:

(h) adding a directory file handle containing logical time information that will differentiate said directory by its entry time, in order to avoid possible double-jeopardy situations in which a directory is added having an AIN value higher than a subsequent "continuation marker" value having a name that is the same as a recently deleted directory with an AIN value lower than the subsequent "continuation marker" value.

7. The method of reading a dynamic, hierarchical file system in accordance with the method of claim 1, wherein a directory file handle is added, said directory file handle containing logical time information for differentiating directories by entry times.

\* \* \* \* \*